Jan. 31, 1961

C. L. DYKE 2,969,986

FERTILIZER SPREADER

Filed Sept. 7, 1956

Charles L. Dyke
INVENTOR

BY Lucas J. DeKoster
HIS ATTORNEY

Jan. 31, 1961 C. L. DYKE 2,969,986
FERTILIZER SPREADER
Filed Sept. 7, 1956 4 Sheets-Sheet 2

Charles L. Dyke
INVENTOR.

BY
HIS ATTORNEY

Jan. 31, 1961 C. L. DYKE 2,969,986
FERTILIZER SPREADER
Filed Sept. 7, 1956 4 Sheets-Sheet 3
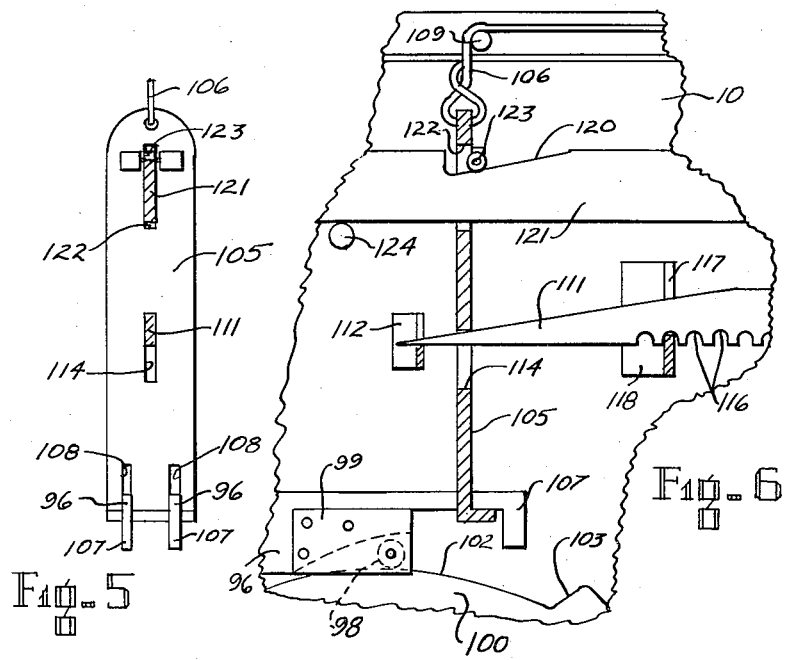
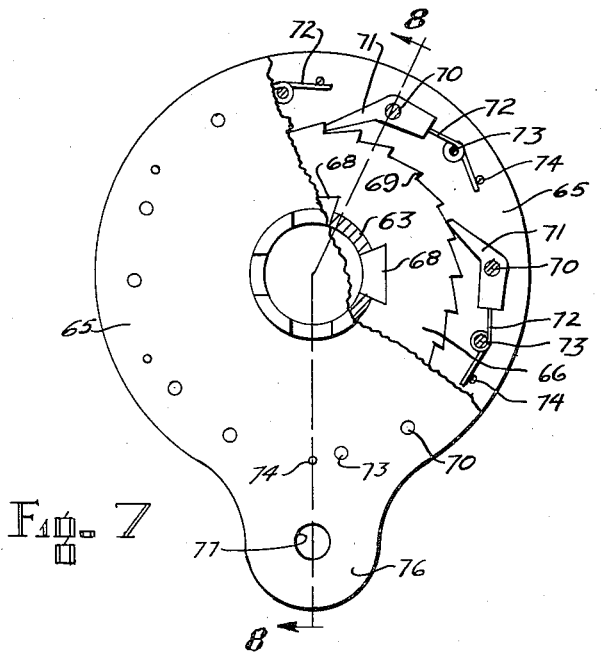
Charles L. Dyke
INVENTOR.
BY Lucas J. DeKoster
HIS ATTORNEY

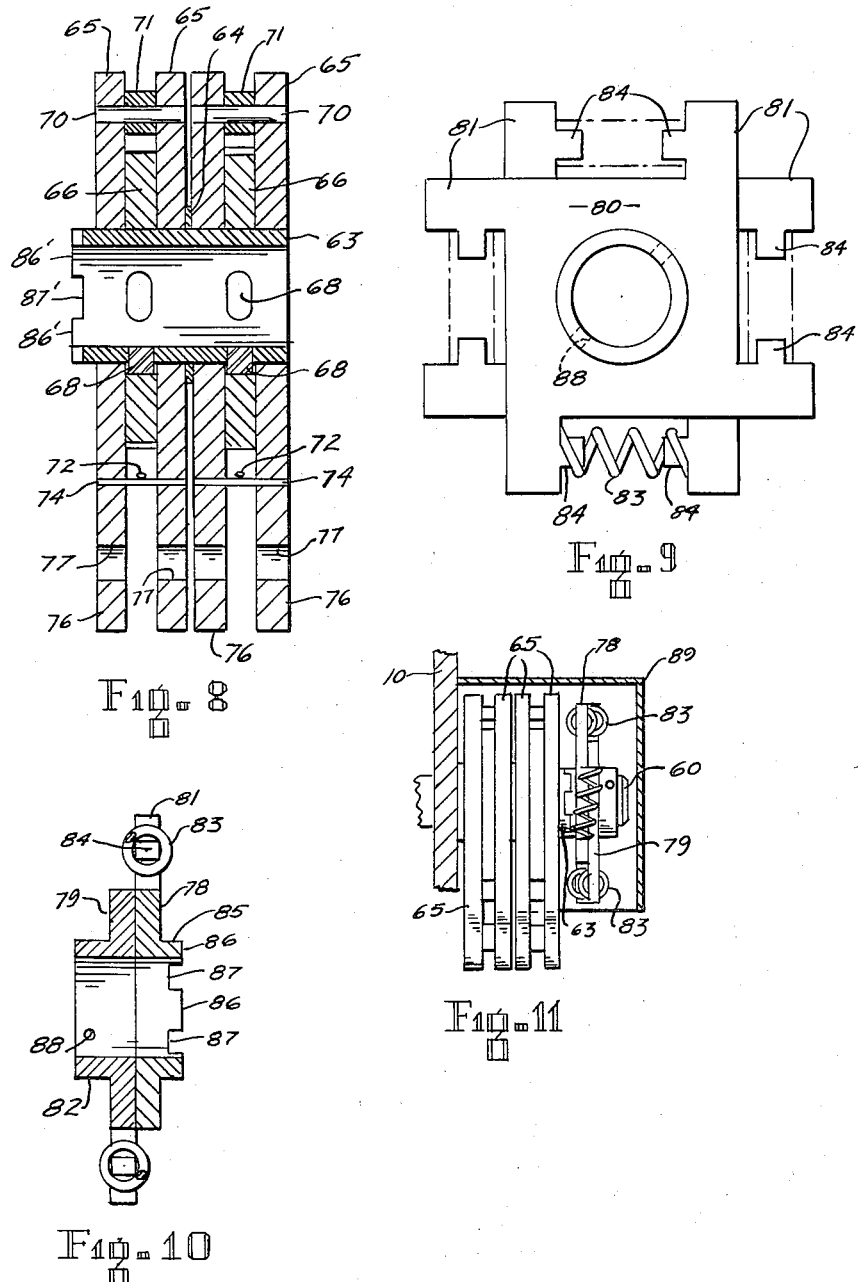

United States Patent Office 2,969,986
Patented Jan. 31, 1961

2,969,986

FERTILIZER SPREADER

Charles L. Dyke, 122 N. Sioux St., Orange City, Iowa; Lester Maris Dyke, Grace Elizabeth Trenneman, and Esther Gertrude Hicks, executors of the estate of said Charles L. Dyke, deceased, assignors to Esther G. Hicks Filed Sept. 7, 1956, Ser. No. 608,611

5 Claims. (Cl. 275—6)

This invention relates to farm implements and more particularly to an improved fertilizer spreader such as is commonly used for the spreading of barnyard manure.

The spreading of barnyard manure on fields as fertilizer is common to most farming practices. The usual machine utilized for this purpose is a manure spreader having a moving apron in the bed of a wagon-like box. This apron is moved to the rear of the box carrying its load into a plurality of rotating devices called beaters. Commonly two of the beaters are each composed of three or four bars extending across the rear of the box. These bars each carry long teeth and are fixed to an axle so that the bars rotate about an axis transverse of the movement of the apron. It is also common to arrange these beaters, as they are called, one above the other or staggered somewhat so that the lower one rotating upward will carry the manure up, off the apron and into the second or upper beater which rotates toward the first. The action of the two beaters is thus to shred the manure.

From the toothed beaters the manure is thrown onto a third rotor called a "widespread beater." The widespread is formed of an axle carrying vanes arranged in wide pitch spirals both ways from the center. This device rotates upwardly into the manure thrown onto it by the toothed beaters; and the spiral vanes, on engaging the mansure, throw it outwardly away from the spreader.

The above described device, while it has been used with some success for many years, has numerous inherent disadvantages which I avoid in my device. For instance the use of three beaters makes an unduly complicated chain drive necessary. In my device I use only a single, novel beater which both shreds and spreads the manure in a single operation. This makes possible the use of a much simpler drive for the beater.

Prior devices used a positive apron drive which would jam if the beaters could not handle the manure because of hardened chunks or frozen manure. In my improved spreader, I provide an apron feed which will automatically stop feeding if the beater cannot handle the load which is fed to it, but maintains beater action till the chunk is broken up, and then automatically starts feeding again.

A complete understanding of my invention and the means by which it accomplishes the above-described advantageous operation may be had by a study of the following specification and the drawings in which.

Figure 1:
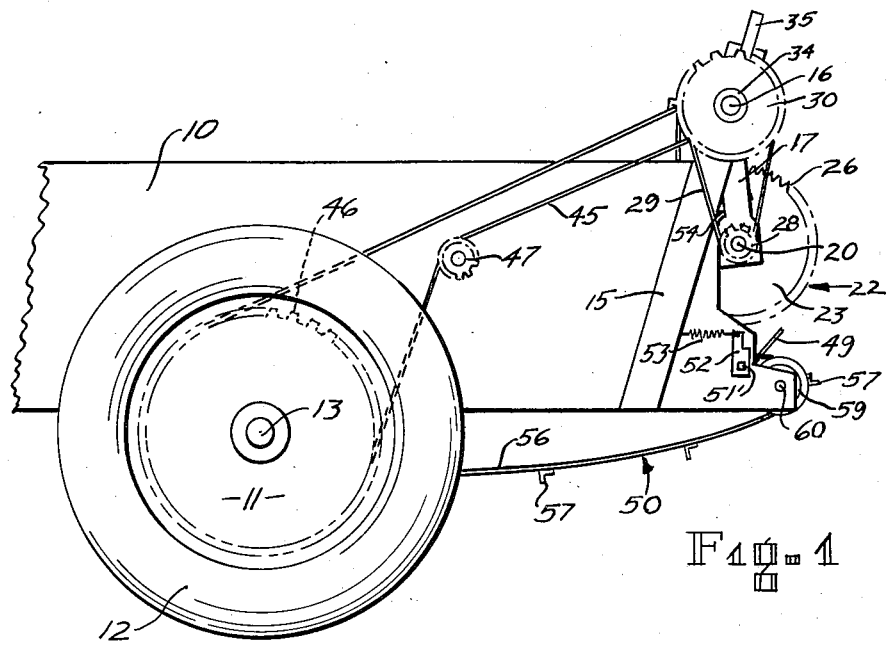
Fig. 1 is a partial side elevational view of my spreader.
Figure 2:
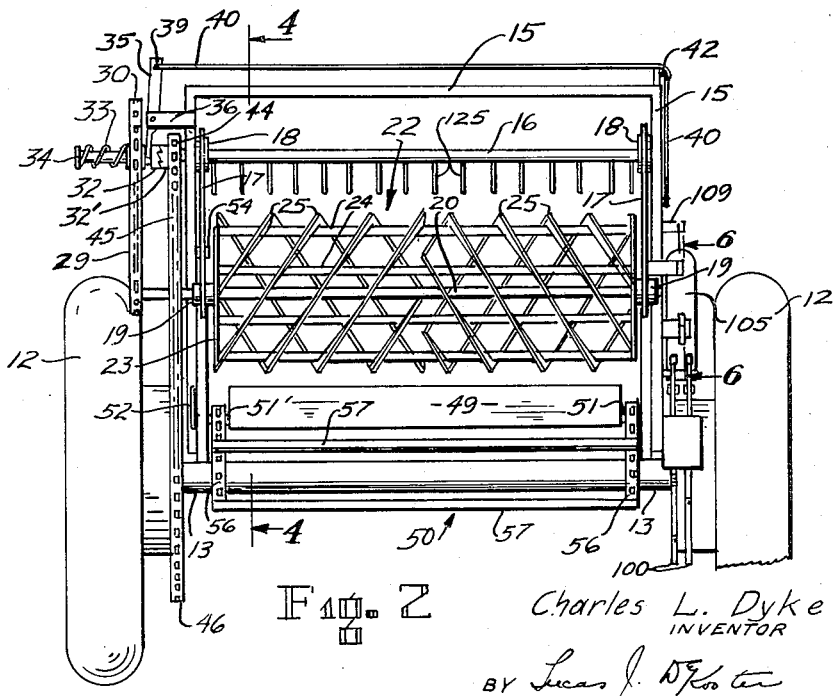
Fig. 2 is a rear elevational view thereof.
Figures 3, 4:
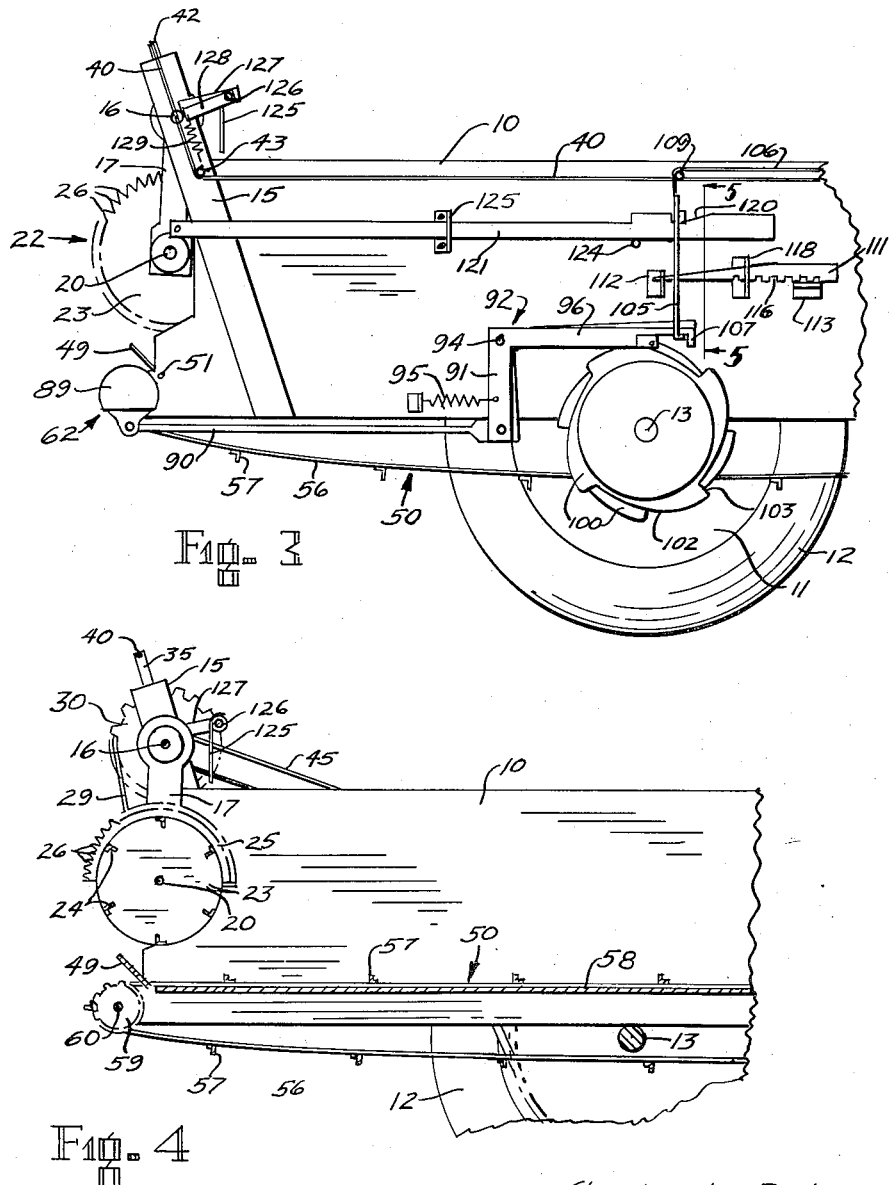

Fig. 3 is a partial side elevational view from the side opposite from Fig. 1, and with a wheel removed to show parts not otherwise visible, Fig. 4 is a sectional view along line 4—4 of Fig. 2, Fig. 5 is a detailed view to an enlarged scale from line 5—5 in Fig. 3, Fig. 6 is a partial sectional view to an enlarged scale from line 6—6 of Fig. 2, Fig. 7 is a detailed view to an enlarged scale of the feed ratchet separate from the rest of the machinery and having a part of one plate broken away to show interior parts, Fig. 8 is a sectional view from line 8—8 of Fig. 7, Fig. 9 is a detailed view to an enlarged scale of the feed shock absorber removed from the spreader, Fig. 10 is a medial sectional view of the shock absorber of Fig. 9, and Fig. 11 is a detailed view of the ratchet-shock absorber assembly in place on the feed shaft.

Briefly my invention consists of an improved manure spreader having only a single beater of novel form, and automatically controlled apron feed controlled by the beater so as to prevent jamming.

More specifically and referring to the figures, my device includes a box 10 of conventional form mounted on conventional wheels 11 and which may be pulled by a tractor in the usual way. Since the hitch and tractor are conventional, they are not shown in the drawings. These will be well understood by anyone acquainted in the art. The wheels 11 have mounted tires 12 and are journalled on an axle 13. At the rear end the box is open as is also conventional, and a framework 15 is built up of srtuctural steel members to support the sides of the box and to provide structure on which the mechanism of my invention may be mounted. I have shown the framework as formed of channel beams, but it will be apparent that other forms could be used.

The mechanism mounted on the framework 15 comprises broadly a rotor means which includes an idler shaft 16 and pivotally journalled thereon, two hangers 17. The hangers include bearings 18 at the shaft 16 to ensure free pivotal motion. At the lower end of each hanger is mounted a second bearing 19 in which the rotor shaft 20 is journalled.

The rotor 22 which is also a part of the rotor means is built up of end plates 23 on each end joined by eight steel stringers 24 which are preferably angle-iron members forming a drum-like structure. This drum should be of fairly large diameter. I have found that a drum of diameter equal to approximately ⅔ to ¾ of the depth of the box works satisfactorily. On this drum are mounted spiral vanes 25, each spiralling out from the center of the drum, and preferably staggered as shown, so that the starting point of one vane is not at the same circumferential location as any other vane. I have used, and I illustrate a drum of eight vanes, four on each side, and each vane making one complete circuit of the drum. I have found this to work very satisfatcorily, although it is possible that more or less might also be used.

Each vane 25 may be composed of a number of individual sections which are conveniently bolted or otherwise fastened to the stringers 24. This form of construction allows easy replacement of the parts of the vane so that, in case of breakage, an entire vane need not be replaced. The vanes are formed with a series of teeth 26 on the outer periphery. The teeth are of simple triangular form, or "V-shaped," having a fairly sharp point. The tooth form is not critical, but I have found that a tooth of about one-inch depth and a spacing of about 1½ inches works quite satisfactorily. The principal consideration is that the teeth should be of definite V-shape so that material will not get caught between the teeth and foul the mechanism. This concept is completely different from the former beaters having spiked teeth which would catch twine or the like and often become badly fouled.

Another new concept in my device lies in the direction of rotation of the beater. In my device the beater rotates downwardly into the load of manure in the box 10. In the device shown, the rotor 22 is fixed to the shaft 20 by keys or a splined shaft or other conventional means, and is driven thereby. The shaft 20, in turn, is driven through a sprocket 28 from a chain 29. The chain 29 is driven from a larger sprocket 30 slidably mounted on the idler shaft 16. On one face of the sprocket 30 is formed one of a pair of engageable clutch members 32 and 32' (Fig. 2). These may be the toothed clutch members as shown and now commonly used in this type of farm machinery. A spring 33 engaged between a collar 34 on the shaft 16 and the outer face of the sprocket 30 normally presses the clutch into engagement.

A conventional disengagement device is used. This comprises a forked lever 35 pivotally mounted on a bracket 36 on the framework 15. The forked end of the lever 35 engages the clutch member 32 in a groove 38 formed therein. The other end of the lever extends above the framework 15 and is formed to provide a hole 39 in which a wire or cable 40 may be engaged. This cable runs transversely of the box 10 above the framework 15, thence over a pulley 42 or the like and downward to the side of the box. A second pulley 43 or grooved bracket or the like changes the direction of the cable again so that it extends forward in a conventional manner to the front of the box where it may be attached to an operating lever (not shown) as is conventional in the art. Thus the clutch members 32 and 32' may be disengaged by pulling the cable 40 to allow the rotor to remain idle while the spreader is being pulled empty, or from the loading place to the location to be fertilized.

The driving clutch member 32' is a part of a small sprocket 44 freely rotatable on the idler shaft 16. This sprocket in the embodiment shown, is driven by a chain 45 which is driven by a large sprocket fixed to one of the wheels 11. An idler sprocket 47 may be used to guide the chain in the desired path. It will be apparent from the drawings that the rotor 22 will rotate at a speed considerably greater than the driving wheel 11. This is desired. The rotor should turn at a comparatively high speed in order to properly shred and throw the manure. It should also be noted that the speed of the rotor will also develop considerable centrifugal force on any object at the periphery of the beater, which effect helps to keep the teeth 26 clean. It will be obvious to those skilled in the art that a power take off drive from the tractor could be used to drive the rotor as is now conventional in the larger sizes of currently used spreaders, and that V-belts or the like could replace the chain and sprocket drive shown on the embodiment described. In some respects, the V-belt and pulley drive might even be preferred to the chain and sprocket.

As noted hereinbefore, the rotor turns in a direction to cut downward into the load of manure. In order to distribute the manure properly it is necessary that the manure, after it is shredded, be thrown upwardly. In order to achieve this result, I provide a sloping plate 49 pivotally mounted in the bed of the box 10 below the moving apron 50 hereinafter described. This plate extends substantially across the rear end of the box and normally slopes upward in a location below and behind the rotor as shown in Figs. 1, 3, and 4. The plate 49 is mounted on pivots 51 and 51' which extend through the side of the box. Pivot 51' is formed with a square end on which is mounted a lever 52. A spring 53 engaged between the lever and the framework 15 or any other convenient attaching point, urges the plate to its normal upward position. However, the spring 53 is sufficiently resilient to allow the plate to be pressed downward for the passage of the apron as will hereinafter appear.

I have found that for best shredding and distributing action the hangers 17 should not be vertical. A slight slope to the rear is necessary and, although the hangers are free to move outward to change the amount of slope, the most efficient starting point seems to be a slope of approximately 1 to 10 from the vertical. At this slope the rotor presses with greater force against the load than if it were vertically beneath the idler shaft, and while the same effect might be gained with mechanical means, the force of gravity seems fully as effective and much less subject to failure. The hangers may be held in the sloped position by any convenient type of bracket 54 which may be fastened to the box 10 or the framework 15.

The apron 50 is of conventional type comprising a pair of side chains 56 carrying cross bars 57 between them. The bars 57 are of angle-iron formation and tend to shove the manure across the floor 58 of the box 10. The chains extend the full length of the box and are thus adapted to move the entire load, returning beneath the box to form an endless chain. At the rear of the box the chains are engaged by drive sprockets 59 fixed to a driving axle 60. The axle is journalled in the sides of the box and is driven by an apron drive mechanism more fully described hereinafter. As thus far described, the apron is of conventional type.

As noted before, the plate 49 extends substantially but not completely across the end of the box 10. At its ends, the plate is cut away so that the chains 56 may run between the edges of the plate 49 and the sides of the box. It will now be seen that as the cross bars 57 are carried to the rear, they will come into engagement with the plate 49. As they press against the plate, it is forced downward against the tension of the spring 53 until the bar has cleared the upper edge of the plate, and then the spring 53 quickly snaps the plate back into place. Thus the apron 50 can move in a normal manner and still the plate 49 is useful for its designed function.

The apron drive means which includes the axle 60 also includes a ratchet mechanism 62 shown in detail in Figs. 7 and 8 and a shock absorber mechanism shown in Figs. 9 and 10. The assembly of these two devices is best shown in Fig. 11. The ratchet consists of a dual device, each of the units of which is similar. For convenience I will describe only a single unit and show how the two are linked together for a finer feed.

The two ratchet devices are mounted side by side on a single sleeve 63 and are spaced apart by a spacer 64. Each ratchet comprises two outer plates 65 held in spaced apart relation by the toothed ratchet plate 66. The ratchet plates 66 are keyed to the sleeve 63 by a novel key 68 of substantially trapezoidal form as best shown in Fig. 7. I have illustrated the key as having rounded lateral edges, but this construction is not necessary to my invention. The key is fitted into an opening in the sleeve 63 and is formed to preserve the inner surface of the sleeve free from any projection. The trapezoidal shape prevents the key from falling into the sleeve and holds it in its proper position after assembly.

The outer plates 65 are held together in each ratchet assembly by pins 70 which may be threaded into one plate and have a head engaging the other, or may be riveted into place. These pins are also the pivotal axles for a series of ratchet dogs 71 spaced about the periphery of the ratchet. As best shown by the two dogs illustrated in Fig. 7, the number of teeth 69 on the ratchet plate 66 is such that the dogs do not all engage the teeth in pushing relationship at the same time. Thus, one of the dogs is in pushing position while the other is on the slope of the tooth. In this manner a finer control of motion is possible since the dogs do not have to move a complete tooth spacing in order to engage the next tooth in pushing relationship. In my device, as illustrated and described, I can, by proper adjustment, move my apron by as little as 1/16 inch per movement as will appear later. The dogs 71 are held against the ratchet plate 66 by small springs 72 which may be coiled around riveted posts 73 and retained by additional pegs 74. It will now be apparent that a back and forward motion of the outer plates 65 will cause intermittent rotary motion in one direction, of the ratchet plate 66 and therefore of the sleeve 63.

To assemble the dual ratchet, the spacer 64 and the two outer plates 65 adjacent to it are first placed on the sleeve 63. The requisite number of keys 68 are inserted into the openings in the sleeve and the ratchet plates 66 are placed over them. The dogs 71 and springs 72 are then assembled on the pins 70, posts 73 and pegs 74 which have previously been placed in the first plate 65. The two outer plates 65 are then placed on the proper riveting or other fastening is finished to hold the device together. While this exact construction is not essential to the operation of my device, I have found it very advantageous because the keys 68 hold the ratchet in their proper axial location on the sleeve 63 without requiring additional collars or the like.

Each of the plates 65 is formed with an ear 76 having a hole 77 therethrough for the attachment of the device to a suitable operating lever hereinafter described. As noted above, the ratchets are both keyed to a common sleeve in side by side relationship. It will thus be apparent that a reciprocating action of the ear 76 of either of the ratchets will cause a progressive turning of the ratchet plate 66 even though the second ratchet mechanism was inoperative except to act as a holding pawl. However, alternate action by the two devices, so that while the one is pulling the other is retracting, makes smoother operation possible. As noted above, it is my design to stagger the dogs 71 at unequal increments relative to the spacing of the teeth 69. This spacing together with the stepped sequence operation of the ratchets makes possible the movement of the plate 66 in each of the dual devices by only a fractional tooth spacing, and with a pair of the devices slightly out of phase, an even finer movement is possible. Thus the apron 50 which is driven by the ratchets can be moved by only a slight distance at a time if desired, or by moving the dogs a longer distance and skipping a few teeth, the apron could be moved a comparatively long distance at each stroke of the ear 76. The only adjustment necessary for the variation in distance of movement would be an adjustment of the magnitude of movement of the ear. This adjustment is provided in my device by means hereinafter described.

The shock absorber mechanism, while not absolutely necessary to the operation of my device, is very desirable. This device is composed of a driven plate 78 and a driving plate 79. These plates are of similar shape, somewhat resembling a swastika, each having a square body part 80 and four ears 81 at the four corners of the square (Fig. 9). The plates are arranged so that the ears 81 on the driven plate oppose those on the driving plate 79, and springs 83 are set between them so that movement of one plate angularly is resiliently transmitted to the other. Studs 84 may be provided on each of the ears 81 to hold the springs 83 in proper location.

Each of the plats 78 and 79 is provided with a collar which fits over the shaft 60. The keyed collar 85 on the driven plate 78 is rotatably journalled on the shaft 60 and is formed with key tongues 86 and grooves 87 to fit similar tongues 86' and grooves 87' on the sleeve 63 as shown in Fig. 11. Thus the ratchet sleeve 63 drives the driven plate 78 and through the springs 83, the driving plate 79. The collar 82 on the driving plate 79 is formed with a hole 88 through which a pin or the like may extend to fix the driving plate to the shaft 60 which thus will be driven thereby.

The whole assembly of ratchet and shock absorber is preferably covered by a shield 89 which may be formed of sheet metal and fastened to the box 10.

The operating means for the ratchet mechanism is best shown in Fig. 3. This means includes a lever 90 for each ratchet, which lever is pinned to the ratchet ears 76 by a pin extending through the holes 77 as previously described. At its other end, each lever is pivotally connected to the end of one leg 91 of a bell crank device 92. These bell cranks are pivotally mounted on a common axis on the side of the box 10 at 94. A tension spring 95 for each crank 92 urges the leg 91 in a rearward direction.

The horizontal leg 96 of each bell crank device extends toward and over the axle 13. Near the end, as best shown in Fig. 6, each horizontal leg 96 carries a roller type cam follower 98 which may be mounted between a pair of small plates 99 fixed to the leg 96. Each follower rides on a cam plate 100, of which there are a pair fixed to one wheel 11. Each cam plate is preferably formed with four lobes consisting of a gradual rise 102 and a rapid drop 103. I have found that a one-inch drop on a diameter of eighteen inches works very successfully. The plates 100 are mounted in a staggered relationship so that the legs 96 are not both raised at the same time. This alternate action causes an alternate horizontal reciprocation of the levers 90, thus operating the ratchets 62 to move the apron 50. Since the raising of one lever 96 is out of phase with the other, the pair of ratchets operate alternately resulting in the smoother operation explained hereinbefore as desirable.

The lengths of the legs 91 and 96 and the dimensions of the drop 103 and the spacing of dogs 71 and teeth 69 of the ratchet are all proportioned so that one raising and drop of the follower 98 will cause an angular movement of the ear 76 on the ratchet equal to considerably more than the minimum movement necessary to operate the ratchet mechanism described. Thus a full raise and drop may index a given dog past two teeth on the ratchet plate, whereas the minimum movement required to cause movement of the ratchet might be only a fraction of the tooth spacing. This construction allows for adjustment of the speed of movement of the apron by control of this distance of rise and fall of the follower 98.

The control means for regulating the apron speed comprises a control plate 105 (Figs. 5 and 6) which is movable vertically and is suspended from a cable 106. Hooked ends 107 of the horizontal legs 96 extend through slots 108 in this plate. The hooks are long enough so that a full raise of the leg 96 by the cam 100 will not cause the hook to become disengaged from the control plate 105 when it is in its lowest position. It will be obvious that by raising the plate 105 sufficiently, and thus rasing the legs 96, the followers 98 could be completely disengaged from the cams 100 and so would completely stop the operation of the ratchets 62 and the movement of the apron 50. It will be equally obvious that at points between complete disengagement and the lowest position of the control plate 105 the movement of the leg 96 induced by the cam 100 will be somewhat less than the maximum provided by a full rise and fall of the cam, and thus will provide for less than full movement of the ratchet plate by the ratchet. This will necessarily result in a slowed movement of the apron.

Three controls of position of the control plate are provided. The first is the cable 106 which extends over a peg 109 and forward of the spreader within reach of the operator on the pulling tractor or to a lever controlled by him. This means is principally designed to be a disengagement device and not a speed control, although it could be used as such. It will be obvious that by pulling the cable, the plate 105 would be raised to completely disengage the followers 98 from the cam 100, thus completely stopping the movement of the apron 50. This is necessary when transporting a load from the loading point to the location to be fertilized.

The second control provided is designed to control the maximum speed of movement of the apron and comprises a wedge shaped cam 111 slidably mounted on guides 112 and 113 on the side of the box 10. This cam is slidable through a slot 114 in the plate 105 with the upper surface of the slot being adapted to rest on the slope of the wedge. Thus, as the wedge is pushed into the slot, the plate 105 is gradually raised causing the legs 96 to also be raised and partially disengaging the followers 98 from their cams 100. Thus instead of a full rise and drop, the followers may become engaged with the rise 102 at a mid-point, and the lever 90 would then be moved less than the maximum possible. This would necessarily cause a less than maximum movement of the ratchet per each lobe of the cam, and thus the movement of the apron would be slowed. Notches 116 are provided in the lower surface of the wedge 111 and are engageable with the lower surface of a slot 117 in a bracket 118 on the side of the box 10, providing for indexing of the position of the wedge 111.

The third control is the most important to the operation of my device. This control also comprises a sloping cam surface 120 formed on a bar 121 extending through a slot 122 in the control plate 105. A roller follower 123 may be provided on the control plate 105 to follow this cam as shown in Fig. 6. The bar 121 is longitudinally moveable and may be supported on a peg 124 and a guide 125 fixed to the box 10. Movement of the bar 121 is provided by its pivotal connection to the hanger 17 of the rotor. It will now be apparent that movement of the apron 50 by the ratchet action as previously described will carry the load against the rotor 22. If the load is soft and easily distributed, the rotor 22 will, in all likelihood, not be moved appreciably from its lowest and most forward position. If, however, the load contains hard lumps or is partially frozen or very heavy and thick, movement of the load against the rotor would cause the rotor to swing to the rear on the hangers 17. Such swinging would cause the bar 121 to be moved rearwardly, and would cause the follower 123 to ride up on the cam surface 120 and thereby raise the control plate to cause a slower movement of the apron. In severe instances, the rotor might even be swung so far out as to cause a complete stopping of the apron. However, the rotor would still be operative, and as soon as the lump or frozen chunk was cut up by the action of the rotor teeth 26, the rotor would swing back and the apron would again move the load into the rotor.

A further refinement which I provide comprises a rake device adapted to keep the load down to the level where it can be easily handled by the rotor 22. This rake consists of a series of spring teeth 125 mounted on a bar 126. The bar may be pivotally mounted in a pair of similar brackets 127 on the framework 15, and at one end may be provided with a fixed lever 128 biased to a downward position by a spring 129. Thus the teeth 125 act to rake back the high parts of the load as the load is carried rearward by the apron.

Thus it is apparent that I have provided an entirely new concept in the operation and mechanism of fertilizer spreaders, providing an efficient and high speed device completely free from jamming or fouling tendencies.

While I have described my invention in one embodiment thereof, I am aware that numerous departures may be made therefrom without departing from the spirit or scope of my invention as limited only by the following claims.

I claim:

1. A fertilizer spreader comprising container means mounted on wheels, load moving apron means mounted on said container means, ratchet means operated by at least one of said wheels and connected to said load moving means whereby said wheels operate said load moving means, rotor means, means for swingably mounting said rotor means on said container means, drive means adapted to drive said rotor means in a diretcion rotating downwardly into said load, vanes on said rotor means, said vanes having teeth thereon adapted to cut into said load, and control means operably connected between said ratchet means and said means for mounting said rotor means whereby the position of said means for mounting said rotor means controls the movement of said ratchet means and thereby of said load moving means.

2. A fertilizer spreader comprising a container for a load of fertilizer, said container being mounted on wheels, said container having an open rear end, rotor means including a frame swingably mounted in said rear end and a rotor journalled in said frame adapted to be rotatingly driven, moving apron means mounted in said container adapted to move said load toward said rear end and into said rotor, means for driving said rotor downwardly into said load, ratchet means in driving engagement with said apron means, cam means on at least one of said wheels and follower means in engagement with said cam means, said follower means being operably connected to said ratchet means to drive said ratchet means in response to motion of said cam means, and control means engaged between said frame and said follower means adapted to interfere with the engagement between said cam means and said follower means whereby the magnitude of motion of said follower means is limited, said control means being engaged with said frame so that the swingable position of said frame controls the operation of said ratchet means.

3. A fertilizer spreader comprising a container for a load of fertilizer, said container being mounted on wheels, said container having an open rear end, rotor means including a frame swingably mounted in said rear end and a rotor journalled in said frame, means for driving said rotor rotatively, moving apron means mounted in said container adapted to move said load toward said rear end and into said rotor, ratchet means in driving engagement with said apron means, bell crank means pivotally mounted on said container, lever means operably engaged between said bell crank means and said ratchet means, cam means on at least one of said wheels, cam follower means engaging said cam means and mounted on said bell crank means whereby motion of said follower means induced by said cam means is transmitted to said ratchet means, a control plate engaging said bell crank means adapted to move said follower means out of engagement with said cam means for at least a portion of the movement of said cam means whereby the magnitude of motion of said follower means is limited, and means engaged between said control plate and said frame whereby the swingable position of said frame controls the position of said control plate to control the motion of said apron means.

4. A fertilizer spreader comprising a container for a load of fertilizer, said container being mounted on wheels, said container having an open rear end, rotor means including a frame swingably mounted in said rear end and a rotor journalled in said frame adapted to be rotatingly driven, means for driving said rotor, moving apron means mounted in said container adapted to move said load toward said rear end and into said rotor, ratchet means in driving engagement with said apron means, bell crank means pivotally mounted on said container, lever means operably engaged between said bell crank means and said ratchet means, cam means on at least one of said wheels, cam follower means engaging said cam means and mounted on said bell crank means whereby motion of said follower means induced by said cam means is transmitted to said ratchet means, a control plate engaging said bell crank means adapted to move said follower means out of engagement with said cam means for at least a portion of the movement of said cam means whereby the magnitude of motion of said follower means is limited, said control plate including cam follower means, bar means connected to said frame adapted to be moved longitudinally by swinging of said frame, cam means formed on said bar means, said cam means being engaged with the follower means on said control plate whereby when a lump of fertilizer causes the frame to swing rearwardly, said control plate moves in a direction to disengage the cam follower means on said bell crank means from the cam means on said wheel for at least a portion of the movement of the wheel thus slowing the rearward movement of the apron means until the lump of fertilizer is discharged by the rotor.

5. A fertilizer spreader comprising container means to contain a load of ferilizer, apron means moveably disposed in said container adapted to carry said load, drive means operably connected to said apron means to cause said apron means to move said load, rotor means, means for swingably mounting said rotor means on said container means near the rear thereof, and control means operably interconnected between said means for mounting said rotor means and said drive means whereby the position of said means for mounting said rotor controls the movement of said drive means.

References Cited in the file of this patent

UNITED STATES PATENTS

| Number | Name | Date |
|---|---|---|
| 279,651 | Kellogg | June 19, 1883 |
| 633,107 | Snyder | Sept. 12, 1899 |
| 885,217 | Arnold | Apr. 21, 1908 |
| 893,789 | Dyk | July 21, 1908 |
| 911,620 | Smith | Feb. 9, 1909 |
| 973,742 | Arnold | Oct. 25, 1910 |
| 1,139,482 | Brown | May 18, 1915 |
| 1,646,772 | Sheppy | Oct. 25, 1927 |
| 1,854,599 | Oppenheim | Apr. 19, 1932 |
| 1,879,114 | Crumb et al. | Sept. 27, 1932 |
| 1,912,412 | Stubbs | June 6, 1933 |
| 2,240,720 | Selhorst | May 6, 1941 |
| 2,300,720 | Wooldridge | Nov. 3, 1942 |
| 2,302,879 | Neighbour et al. | Nov. 24, 1942 |
| 2,344,317 | MacDonald | Mar. 14, 1944 |
| 2,555,283 | Barker | May 29, 1951 |
| 2,591,993 | Aijala | Apr. 8, 1952 |
| 2,605,106 | Gilmore | July 29, 1952 |
| 2,708,582 | Adams | May 17, 1955 |
| 2,769,641 | Brown | Nov. 6, 1956 |